US011767751B2

(12) United States Patent
Coenen

(10) Patent No.: US 11,767,751 B2
(45) Date of Patent: Sep. 26, 2023

(54) DETERMINING A CHARACTERISTIC ASSOCIATED WITH A RESERVOIR

(71) Applicant: Reveal Energy Services, Inc., Houston, TX (US)

(72) Inventor: Erica Wilhelmina Catharina Coenen, Spring, TX (US)

(73) Assignee: Reveal Energy Services, Inc., Houston, TX (US)

( * ) Notice: Subject to any disclaimer, the term of this patent is extended or adjusted under 35 U.S.C. 154(b) by 32 days.

(21) Appl. No.: 17/518,402

(22) Filed: Nov. 3, 2021

(65) Prior Publication Data
US 2022/0136383 A1 May 5, 2022

Related U.S. Application Data

(60) Provisional application No. 63/109,540, filed on Nov. 4, 2020.

(51) Int. Cl.
*E21B 47/06* (2012.01)
*E21B 43/26* (2006.01)

(52) U.S. Cl.
CPC .............. *E21B 47/06* (2013.01); *E21B 43/26* (2013.01); *E21B 2200/20* (2020.05)

(58) Field of Classification Search
CPC ...... E21B 47/10; E21B 47/06; E21B 2200/20; G01V 99/005
See application file for complete search history.

(56) References Cited

U.S. PATENT DOCUMENTS

| 7,299,132 | B2 * | 11/2007 | Sayers | ..................... G01V 1/30 73/152.43 |
| 8,184,502 | B2 | 5/2012 | Xu | |
| 8,190,414 | B2 * | 5/2012 | Huang | ................... G01V 11/00 703/10 |
| 8,204,727 | B2 * | 6/2012 | Dean | ...................... E21B 43/26 703/10 |
| 8,265,915 | B2 * | 9/2012 | Hsu | ...................... E21B 49/006 703/10 |
| 8,280,709 | B2 * | 10/2012 | Koutsabeloulis | ....... E21B 43/00 703/10 |

(Continued)

OTHER PUBLICATIONS

Kamrin, "Quasi-Analytical Solution of Pore Fluid Pressurization in a Crack Due to Adjacent Crack Pressurization", Associate Professor in the Department of Mechanical Engineering—Massachusetts Institute of Technology, 9 pages.

(Continued)

*Primary Examiner* — Kenneth L Thompson
(74) *Attorney, Agent, or Firm* — Fish & Richardson P.C.

(57) ABSTRACT

Techniques for determining a reservoir characteristic include determining, with an analytical solution, a change to at least one control point of a boundary of a control volume defined in a subterranean formation, the change to the at least one control point caused by a hydraulic fracture formed in or adjacent the subterranean formation; determining, with a numerical solution, a fluid pressure change of the control volume based on the change to the at least one control point; and determining, with a mechanical model based on the analytical solution and the numerical solution, at least one reservoir characteristic based at least in part on the determined fluid pressure change of the control volume.

39 Claims, 5 Drawing Sheets

(56) References Cited

U.S. PATENT DOCUMENTS

| | | |
|---|---|---|
| 8,494,827 B2 | 7/2013 | Mutlu et al. |
| 8,938,363 B2* | 1/2015 | Beasley ................. E21B 43/26 |
| | | 166/308.1 |
| 9,416,642 B2* | 8/2016 | Bai ......................... G06F 30/20 |
| 9,507,889 B2 | 11/2016 | Chapman et al. |
| 9,988,900 B2* | 6/2018 | Kampfer ................. E21B 43/26 |
| 10,982,535 B2* | 4/2021 | Wang ..................... E21B 49/00 |
| 11,230,915 B2* | 1/2022 | Dusterhoft ............. G01V 1/226 |
| 11,255,184 B1* | 2/2022 | Xia ........................ E21B 43/26 |
| 11,255,997 B2* | 2/2022 | Raterman ............. G01V 9/005 |
| 11,396,808 B2* | 7/2022 | Jaaskelainen ........... E21B 41/00 |
| 2006/0153005 A1* | 7/2006 | Herwanger ............. G01V 1/30 |
| | | 367/38 |
| 2015/0205006 A1* | 7/2015 | Maerten ................. G06F 30/20 |
| | | 703/2 |
| 2017/0022808 A1 | 1/2017 | Busetti et al. |

OTHER PUBLICATIONS

Meng et al., "Evaluation of the Eshelby Solution for the Ellipsoidal Inclusion and Heterogeneity", Stanford Rock Fracture Project, 2011, 22:C1-C10.

* cited by examiner

DETERMINING A CHARACTERISTIC ASSOCIATED WITH A RESERVOIR

CROSS-REFERENCE TO RELATED APPLICATION

This application claims priority under 35 U.S.C. § 119 to U.S. Provisional Patent Application Ser. No. 63/109,540, filed on Nov. 4, 2020, the entire contents of which are incorporated by reference herein.

TECHNICAL FIELD

This specification relates to systems and method for determining a characteristic associated with a reservoir.

BACKGROUND

Certain geologic formations, such as unconventional reservoirs in shale, sandstone, and other rock types, often exhibit increased hydrocarbon production subsequent to one or more completion operations being performed. One such completion operation can be a hydraulic fracturing operation, in which a liquid is pumped into a wellbore to contact the geologic formation and generate fractures throughout the formation due to a pressure of the pumped liquid (e.g., that is greater than a fracture pressure of the rock formation). In some cases, an understanding of one or more characteristics of a reservoir can be helpful in understanding a potential hydrocarbon production from the geologic formation.

SUMMARY

In a general implementation according to the present disclosure, a computer-implemented method includes determining, with an analytical solution executed by one or more hardware processors, a change to at least one control point of a boundary of a control volume defined in a subterranean formation, the change to the at least one control point caused by a hydraulic fracture formed in or adjacent the subterranean formation; determining, with a numerical solution executed by the one or more hardware processors, a fluid pressure change of the control volume based on the change to the at least one control point; and determining, with a mechanical model generated by the one or more hardware processors based on the analytical solution and the numerical solution, at least one reservoir characteristic based at least in part on the determined fluid pressure change of the control volume.

In an aspect combinable with the general implementation, the change to the at least one control point includes a stress field.

In another aspect combinable with any of the previous aspects, determining the fluid pressure change of the control volume based on the change to the at least one control point includes evaluating, with the one or more hardware processors, a stress tensor of the stress field; and determining, with the one or more hardware processors, the fluid pressure change of the control volume based on the evaluation of the stress tensor.

In another aspect combinable with any of the previous aspects, the at least one control point defines at least one stress on the boundary of the control volume.

In another aspect combinable with any of the previous aspects, the at least one control point includes a plurality of control points that define the stress field.

In another aspect combinable with any of the previous aspects, the change to the at least one control point includes a strain field.

In another aspect combinable with any of the previous aspects, determining the fluid pressure change of the control volume based on the change to the at least one control point includes evaluating, with the one or more hardware processors, a strain tensor of the strain field; and determining, with the one or more hardware processors, the fluid pressure change of the control volume based on the evaluation of the strain tensor.

In another aspect combinable with any of the previous aspects, the at least one control point defines at least one strain on the boundary of the control volume.

In another aspect combinable with any of the previous aspects, the at least one control point includes a plurality of control points that define the strain field.

In another aspect combinable with any of the previous aspects, the change to the at least one control point includes a traction field.

In another aspect combinable with any of the previous aspects, determining the fluid pressure change of the control volume based on the change to the at least one control point includes evaluating, with the one or more hardware processors, a traction vector of the traction field; and determining, with the one or more hardware processors, the fluid pressure change of the control volume based on the evaluation of the traction vector.

In another aspect combinable with any of the previous aspects, the at least one control point defines at least one traction on the boundary of the control volume.

In another aspect combinable with any of the previous aspects, the at least one control point includes a plurality of control points that define the traction field.

In another aspect combinable with any of the previous aspects, the change to the at least one control point includes a displacement field.

In another aspect combinable with any of the previous aspects, determining the fluid pressure change of the control volume based on the change to the at least one control point includes evaluating, with the one or more hardware processors, a displacement vector of the displacement field; and determining, with the one or more hardware processors, the fluid pressure change of the control volume based on the evaluation of the displacement vector.

In another aspect combinable with any of the previous aspects, the at least one control point defines at least one displacement on the boundary of the control volume.

In another aspect combinable with any of the previous aspects, the at least one control point includes a plurality of control points that define the displacement field.

In another aspect combinable with any of the previous aspects, the control volume includes at least a portion of a wellbore formed from a terranean surface to the subterranean formation, and the portion of the wellbore is fluidly sealed from the hydraulic fracture.

In another aspect combinable with any of the previous aspects, the at least one control point includes a plurality of control points representative of a plurality of displacements on a boundary of the portion of the wellbore.

In another aspect combinable with any of the previous aspects, the wellbore includes a first wellbore, and the hydraulic fracture formed in or adjacent the subterranean formation emanates from a second wellbore different than the first wellbore.

In another aspect combinable with any of the previous aspects, the at least one reservoir characteristic includes a reservoir effect that includes at least one of undrained rock compression or fluid migration.

Another aspect combinable with any of the previous aspects further includes determining at least a part of a hydraulic fracture geometry of the hydraulic fracture or a fracture growth rate of the hydraulic fracture, or both based on the determination of the undrained rock compression effect.

Another aspect combinable with any of the previous aspects further includes determining an effective hydraulic connectivity in the subterranean formation or a rate of leak-off of a treatment fluid that forms the hydraulic formation into the subterranean formation based on the determination of the fluid pressurization effects.

In another aspect combinable with any of the previous aspects, the hydraulic fracture emanates from a first wellbore formed in the subterranean formation, and the control volume includes a sealed section of a second wellbore formed in the subterranean formation that is different than the first wellbore.

In another aspect combinable with any of the previous aspects, the at least one control point includes at least one displacement representative of at least one of a displacement, a stress tensor, a strain tensor, or a traction vector on a boundary of the sealed section.

In another aspect combinable with any of the previous aspects, the at least one dimension of the hydraulic fracture includes at least one of a half-length of the hydraulic fracture, a length of the hydraulic fracture, a half-height of the hydraulic fracture, or a height of the hydraulic fracture.

In another aspect combinable with any of the previous aspects, the analytical solution includes $u_i(x)=f(\text{Dim}_{treatfrac}, \text{vec})$, where $u_i(x)$ is the displacement field that includes the at least one control point, and is a function of one or more dimensions of the control volume ($\text{Dim}_{cv}$), one or more dimensions of the treatment fracture ($\text{Dim}_{treatfrac}$), and a vector between the control volume and the treatment fracture (vec).

In another aspect combinable with any of the previous aspects, the analytical solution further includes $u_i(x)=f(\text{Dim}_{treatfrac}, \text{vec}, \text{rot}, \text{geo})$, where $u_i(x)$ is the displacement field that includes the at least one control point, and is a function of one or more dimensions of the control volume ($\text{Dim}_{cv}$), one or more dimensions of the treatment fracture ($\text{Dim}_{treatfrac}$), a vector between the control volume and the treatment fracture (vec), a rotation of the control volume relative to the treatment fracture (rot), and one or more geologic properties of the subterranean formation (geo).

In another aspect combinable with any of the previous aspects, the analytical solution includes a modified Eshelby solution.

In another aspect combinable with any of the previous aspects, the modified Eshelby solution includes one or more equations that determines the at least one control point based at least in part on a plurality of parameters that are associated with the control volume and the hydraulic fracture.

In another aspect combinable with any of the previous aspects, the plurality of parameters include at least two dimensions of the control volume, at least two dimensions of the hydraulic fracture, and at least three dimensions that represent a vector between the control volume and the hydraulic fracture.

In another aspect combinable with any of the previous aspects, the plurality of parameters further include at least three dimensions that represent an axis of rotation between the control volume and the hydraulic fracture and an angle of rotation about the axis of rotation.

In another aspect combinable with any of the previous aspects, the plurality of parameters further include one or more geologic characteristics of the subterranean formation.

In another aspect combinable with any of the previous aspects, at least one of the equations includes:

$$u_i(x) = \frac{1}{8\pi(1-v)}(\psi_{,jli}\epsilon^*_{jl} - 2v\epsilon^*_{mm}\phi_{,i} - 4(1-v)\epsilon^*_{il}\phi_{,l}),$$

where $u_i(x)$ represents the displacement field that includes the at least one control point, $\epsilon^*$ is the Eigenstrain, $v$ is Poisson's ratio, and $\psi$ and $\Phi$ are given by:

$$\Phi(x) = \int_\Omega |x - x'| dx', \text{ and } \Psi(x) = \int_\Omega \frac{1}{|x - x'|} dx'.$$

In another aspect combinable with any of the previous aspects, determining, with a numerical solution executed by the one or more hardware processors, a fluid pressure change of the control volume based on the change to the at least one control point, includes calculating, with the numerical solution executed by the one or more hardware processors, a pressure transfer function on the control volume based on the fluid pressure change on the control volume.

Other general implementations according to the present disclosure include computing systems and non-transitory, computer readable media. For example, another general implementation includes a distributed computing system that includes one or more memory modules; and one or more hardware processors communicably coupled to the one or more memory modules and configured to execute instructions stored in the one or more memory modules to perform operations including the steps of any one of the computer-implemented methods described herein.

The details of one or more implementations of the subject matter described in this disclosure are set forth in the accompanying drawings and the description below. Other features, aspects, and advantages of the subject matter will become apparent from the description, the drawings, and the claims.

DETAILED DESCRIPTION

Figure 1A:
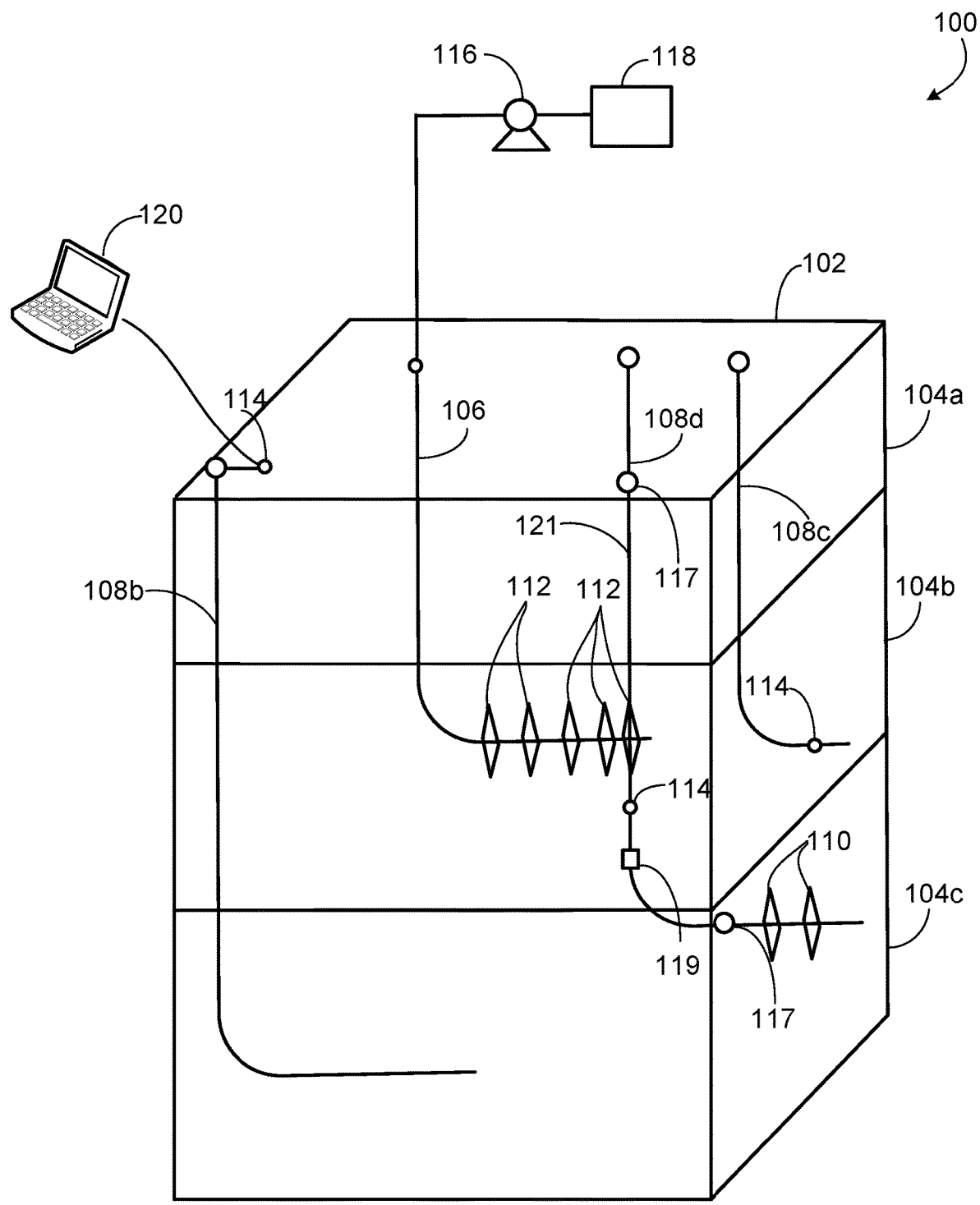
FIGS. 1A-1C are schematic illustrations of an example implementation of a reservoir modeling system within a hydraulic fracturing system.
Figure 1B:
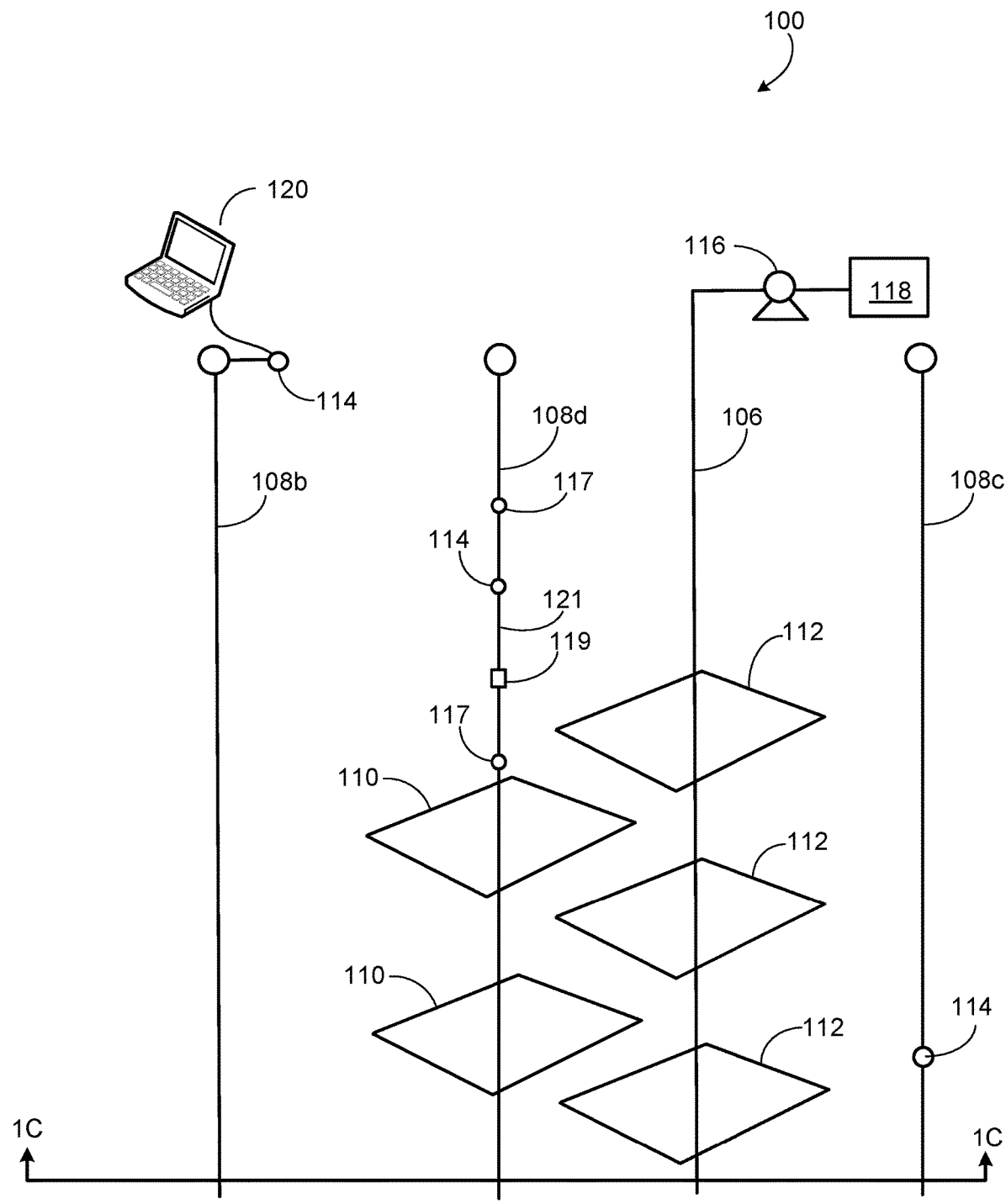
Figure 1C:
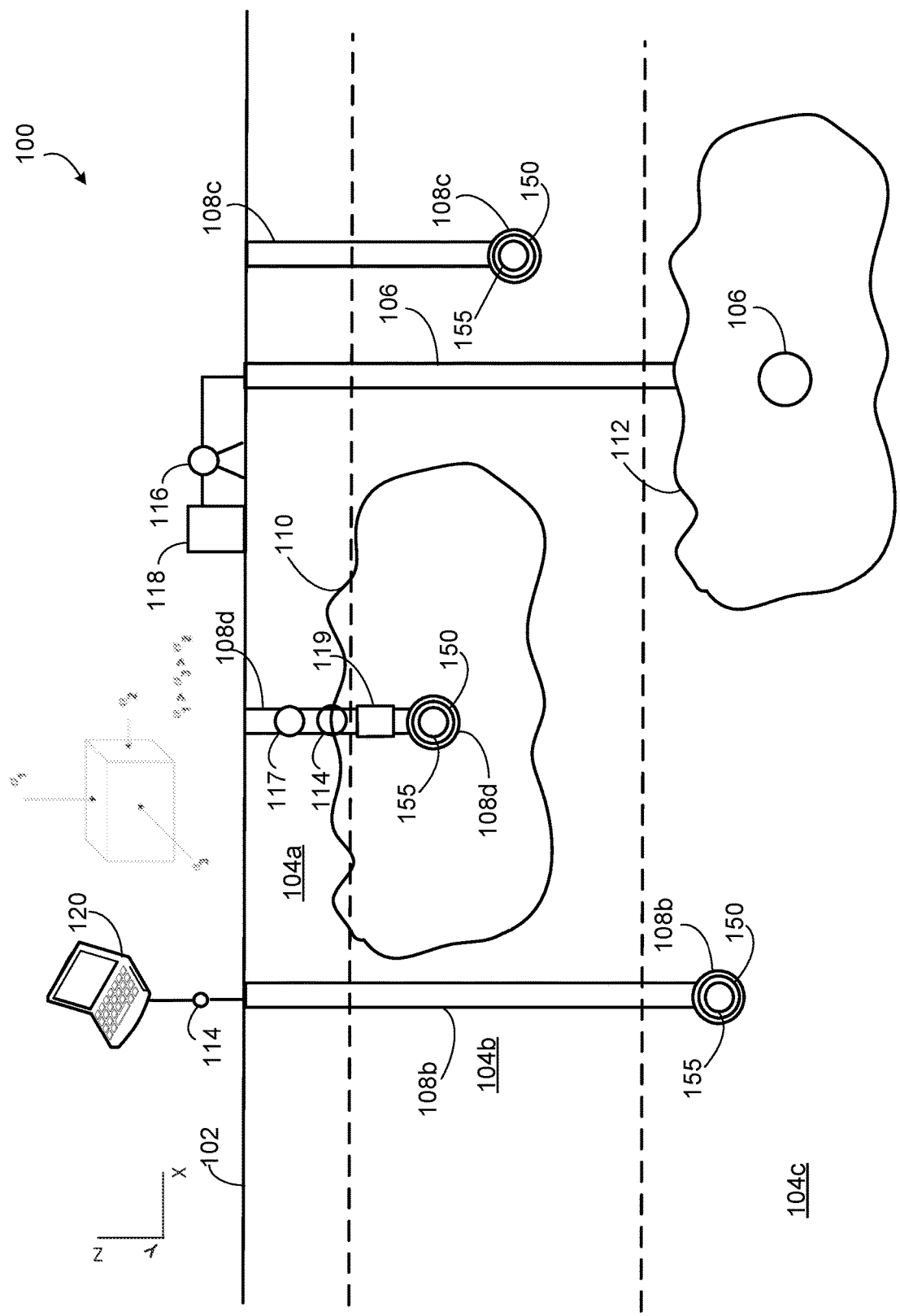

FIGS. 1A-1C are schematic illustrations of an example implementation of a reservoir modeling system 120 (a structured data processing system) within a hydraulic fracturing system 100. As shown, system 100 includes one or more monitor wellbores (labeled 108b-108d in this example) that are formed from a terranean surface 102 to one or more subterranean zones 104a-104c located below the terranean surface 102. In this example, one, some, or all of the monitor wellbores 108b-108d can include a plug 119 or other fluid barrier positioned in the particular wellbore 108*b*-108*d*, and a pressure sensor 114 (shown fluidly coupled to each monitor wellbore 108*b*-108*d*). In this example, the pressure sensor 114 is located at or near a wellhead on one or more of the monitor wellbores 108*b*-108*d*, but in alternate implementations, the pressure sensor 114 can be positioned within or about (e.g., inside a casing) one or more of the particular monitor wellbores 108*b*-108*d* below the terranean surface 102.

Generally, according to the present disclosure, one or more of the monitor wellbores 108*b*-108*d* can be used to measure pressure variations in a fluid contained in (e.g., sealed within) the particular wellbore 108*b*-108*d* that are induced by a hydraulic fracturing fluid pumped into a treatment wellbore 106 to form one or more hydraulic fractures 112 formed from the treatment wellbore 106. Such induced pressure variations, as explained more fully below, can be used to determine information regarding a reservoir, such as one or more of the subterranean zones 104*a*-104*c*.

Each monitor wellbore 108*b*-108*d* shown in FIGS. 1A-1C includes vertical and horizontal sections, as well as a radiused section that connects the vertical and horizontal portions. Generally, and in alternative implementations, each wellbore 108*b*-108*d* can include horizontal, vertical (e.g., only vertical), slant, curved, and other types of wellbore geometries and orientations. The wellbores 108*b*-108*d* each include a casing (as explained in more detail herein) that is cemented or otherwise secured to the wellbore wall to define a borehole in the inner volume of the casing. In this example, wellbores 108*b*, 108*c*, and 108*d*, may include no perforations or an insignificant number of perforations that does not allow significant fluid mass exchange between the wellbores 108*b*, 108*c*, and 108*d* and the subterranean formation.

Although illustrated as generally vertical portions and generally horizontal portions, such parts of the wellbores 108*b*-108*d* may deviate from exactly vertical and exactly horizontal (e.g., relative to the terranean surface 102) depending on the formation techniques of the particular wellbore 108*b*-108*d*, type of rock formation in the subterranean formations 104*a*-104*c*, and other factors. Generally, the present disclosure contemplates all conventional and novel techniques for forming the wellbores 108*b*-108*d* from the surface 102 into the subterranean formations 104*a*-104*c*.

In this example, wellbore 108*b* includes no hydraulic fractures and no perforations. Thus, in this example, all or a substantial portion of the wellbore 108*b* is considered to be fluidly sealed to the subterranean formation 104*c* (i.e., a sealed wellbore, such as a drilled, uncompleted ("DUC") wellbore). The wellbore 108*b* is a sealed wellbore with a pressure sensor 114 mounted at the surface 102 (e.g., in the wellhead of the wellbore 108*b*) or within the wellbore 108*b* (i.e., in fluid contact with the fluid in the wellbore 108*b*).

In this example, wellbore 108*c* may also be a sealed or substantially sealed wellbore, e.g., with no hydraulic fractures emanating therefrom. Further, wellbore 108*c* may have no or an insignificant number of perforations. In this example, the pressure sensor 114 is positioned, e.g., at a horizontal portion of the wellbore 108*c*. In this example, the pressure sensor 114 of wellbore 108*c* is mounted so as to be in direct fluid communication with fluids in the wellbore 108*c*. In some aspects, the pressure sensor 114 is a primary pressure sensor that measures fluid pressure (e.g., a change in pressure) within the wellbore 108*c*. A secondary pressure sensor, such as a sensor mounted on an exterior of the casing, may also be used in combination with the pressure sensor 114, such as to measure the pore-pressure change inside the subterranean formation adjacent to the wellbore 108*c*.

In this example, wellbore 108*d* may include a sealed or substantially sealed wellbore section. In some examples, as shown, fractures 110 can be formed downhole of a wellbore seal 119 (e.g., packer, bridge plug, or otherwise) mounted at or near a heel portion of the wellbore 108*d*). A sealed section 121 of the wellbore 108*d*, in this example, is formed between a sealed or closed wellhead (at the terranean surface 102) and the wellbore seal 119 (or, for example, between the wellbore seal 119 shown in FIG. 1A and another wellbore seal positioned between the wellhead and the pressure sensor 114). The sealed section 121 has no hydraulic fractures emanating therefrom. Further, sealed section 121 may have no or an insignificant number of perforations between the wellhead and a wellbore seal 119. Thus, the sealed section 121 is fluidly decoupled from the remaining portions of the wellbore 108*d* that are downhole of the seal 119. In this example, the sealed section 121 is also fluidly decoupled from the subterranean formation 104*b*. In this example, the sealed section 121 can be much smaller (e.g., in an axial or length dimension) as compared to the entire axial dimension or length of the wellbore 108*d*. The pressure sensor 114, in this example, is mounted within the sealed section 121 of the wellbore 108*d* (i.e., in fluid contact with fluid within the sealed section 121).

In alternative aspects, there may be additional wellbore seals 117 (one or more) positioned in the wellbore 108*d* as shown. In some aspects, a wellbore seal may be positioned between the wellhead and the wellbore seal 119. In some aspects, there may be two wellbore seals 117 positioned uphole (or downhole) of the wellbore seal 119. In some aspects, there may be a single wellbore seal 117 positioned downhole (e.g., toward a toe of the wellbore) of the wellbore seal 119. Thus, a sealed section of the wellbore 108*d* may be defined, e.g., between a wellbore seal 117 and the wellbore seal 119, between two wellbore seals 117, between a wellbore seal 117 and the wellhead, or between a wellbore seal 117 (or 119) and the toe of the wellbore 108*d*.

System 100 in FIGS. 1A-1C, therefore, illustrates several different monitor wellbores. Although a single monitor wellbore is shown for each of the example wellbores 108*b*-108*d*, the system 100 may include more or fewer of each of these wellbores 108*b*-108*d*. For example, in some aspects, the system 100 may include many monitor wellbores 108*b* but not any of wellbores 108*c* or 108*d*. As another example, the system 100 may include a single or multiple monitor wellbores 108*d* only (along with one or many treatment wellbores 106). Thus, the present disclosure contemplates all variety of combinations of monitor and treatment wellbores within the system 100.

The treatment wellbore 106 shown in FIGS. 1A-1C includes vertical and horizontal sections, as well as a radiused section that connects the vertical and horizontal portions. Generally, and in alternative implementations, the wellbore 106 can include horizontal, vertical (e.g., only vertical), slant, curved, and other types of wellbore geometries and orientations. The treatment wellbore 106 may include a casing (not shown) that is cemented or otherwise secured to the wellbore wall to define a borehole in the inner volume of the casing. In alternative implementations, the wellbore 106 can be uncased or include uncased sections. Perforations (not specifically labeled) can be formed in the casing to allow fracturing fluids and/or other materials to flow out of the wellbore 106. Perforations can be formed using shape charges, a perforating gun, and/or other tools.

Although illustrated as generally vertical portions and generally horizontal portions, such parts of the wellbore 106 may deviate from exactly vertical and exactly horizontal (e.g., relative to the terranean surface 102) depending on the formation techniques of the wellbore 106, type of rock formation in the subterranean formation 104b, and other factors. Generally, the present disclosure contemplates all conventional and novel techniques for forming the wellbore 106 from the surface 102 into the subterranean formation 104b. Generally, according to the present disclosure, the treatment wellbore 106 is used to form one or more hydraulic fractures 112 that can produce or enhance production of hydrocarbons or other fluids in the subterranean zone 104b (and other formations). A hydraulic fracturing fluid used to form such fractures 112, during formation of the fractures 112, may induce pressure variations in a fluid contained in one or more of the monitor wellbores 108b-108d, which can be used to determine one or more characteristics of the reservoir (e.g., subterranean zones 104a-104c) and even the wellbores 108b-108d.

In some aspects, there can be multiple (e.g., 10 or more) wellbores formed into the subterranean zones 104a-104c, with a single wellbore assigned to be the monitor wellbore and the remaining wellbores assigned to be treatment wellbores. Alternatively, there can be multiple monitor wellbore and multiple treatment wellbores within a set of wellbores formed into the subterranean zone. Further, in some aspects, one or more wellbores in a set of wellbores formed into the subterranean zones 104a-104c can be initially designated as monitor wellbores while one or more other wellbores can be designated as treatment wellbores. Such initial designations, according to the present disclosure, can be adjusted over time such that wellbores initially designated monitor wellbores can be re-designated as treatment wellbores while wellbores initially designated treatment wellbores can be re-designated as monitor wellbores.

The example hydraulic fracturing system 100 includes a hydraulic fracturing liquid circulation system 118 (i.e., a frac spread) that is fluidly coupled to the treatment wellbore 106. In some aspects, the hydraulic fracturing liquid circulation system 118, which includes one or more pumps 116, is fluidly coupled to the subterranean formation 104 (which could include a single formation, multiple formations or portions of a formation) through a working string (not shown). Generally, the hydraulic fracturing liquid circulation system 118 can be deployed in any suitable environment, for example, via skid equipment, a marine vessel, sub-sea deployed equipment, or other types of equipment and include hoses, tubes, fluid tanks or reservoirs, pumps, valves, and/or other suitable structures and equipment arranged to circulate a hydraulic fracturing liquid through the treatment wellbore 106 and into the subterranean formations 104a-104c to generate the one or more fractures 112. The working string is positioned to communicate the hydraulic fracturing liquid into the treatment wellbore 106 and can include coiled tubing, sectioned pipe, and/or other structures that communicate fluid through the wellbore 106. The working string can also include flow control devices, bypass valves, ports, and or other tools or well devices that control the flow of fracturing fluid from the interior of the working string into the subterranean formations 104a-104c.

Although labeled as a terranean surface 102, this surface can be any appropriate surface on Earth (or other planet) from which drilling and completion equipment can be staged to recover hydrocarbons from a subterranean zone. For example, in some aspects, the surface 102 may represent a body of water, such as a sea, gulf, ocean, lake, or otherwise. In some aspects, all are part of a drilling and completion system, including hydraulic fracturing system 100, can be staged on the body of water or on a floor of the body of water (e.g., ocean or gulf floor). Thus, references to terranean surface 102 includes reference to bodies of water, terranean surfaces under bodies of water, as well as land locations.

Subterranean formations 104a-104c may include one or more rock or geologic formations that bear hydrocarbons (e.g., oil, gas) or other fluids (e.g., water) to be produced to the terranean surface 102. Subterranean formations 104a-104c can be or form one or more reservoirs. For example, the rock or geologic formations can be shale, sandstone, or other type of rock, typically, that can be hydraulically fractured to produce or enhance production of such hydrocarbons or other fluids. In some aspects, one or more of the subterranean formations 104a-104c comprise different rock formations (e.g., shales, sandstones, or otherwise). In some aspects, one or more of the subterranean formations 104a-104c comprise similar rock formations (e.g., shales, sandstones, or otherwise) but in distinct layers represented by the formations 104a-104c (e.g., upper layer, lower layer).

As shown specifically in FIG. 1C, the treatment fractures 112 emanating from the treatment wellbore 106 can extend in the plane normal to (perpendicular to) the direction of minimum principal stress (62) when formed. As shown in this example, wellbores are typically drilled in a direction that is as close as possible to the direction of minimum principle stress, such that hydraulic fractures propagate away from the wellbore and not along its trajectory. As shown, when projected to a two dimensional space normal to the direction of minimum principal stress (e.g. the $\sigma_1$-$\sigma_3$ plane) such fractures overlap in the plane, though they can be separated by significant distance in the direction of $\sigma_2$. Further, in some aspects, treatment fractures 112 (as well as monitor wellbores and treatment wellbores) can be rotated relative to each other as the relationship between $\sigma_1$, $\sigma_2$, and $\sigma_3$ changes along a wellbore. As shown in this figure, and as an example description for a perfect normal faulting situation, a set of rock stress axes are illustrated, with the overburden stress, $\sigma_i$, in the same direction as the z-axis. A minimum principal stress, $\sigma_2$, and a maximum principal stress, $\sigma_3$, are offset 900 from each other. The induced spatial layout of the stress field about a newly formed hydraulic fracture is highly variable and non-linear, and while general statements can be made about the magnitude of this induced stress field being related to proximity to the hydraulic fracture—no simple relationship can be assumed relating it to proximity in the direction of minimum principal stress, nor to "overlap" in the plane normal to the direction of minimum principal stress.

As shown in FIG. 1C, each of the monitor wellbores 108b-108d includes a wellbore tubular 155 held in place in the respective wellbore by cement 150. In this example, the cement 150 can represent multiple layers of cement or other hardenable material. Thus, reference to cement 150 includes reference to multiple layers of cement 150 as well. Further, the wellbore tubular 155 can represent one or more wellbore tubulars 155, such as one or more casings, one or more production strings, one or more wellbore liners, or a combination of such wellbore tubulars. Thus, reference to the wellbore tubular 155 includes reference to multiple wellbore tubulars 155 as well. Such wellbore tubulars 155 can be positioned in concentric, overlapping layers in the respective monitor wellbore, or connected in series within the wellbore 108b-108d to form a single layer.

In some aspects, the combination of the cement 150 and the wellbore tubular 155 (e.g., a "well construction layer")

forms a fluidly impermeable and mechanically deformable layer between the rock surface created by the wellbore and the fluid within the wellbore tubular 155. The well construction layer can be fluidly impermeable at least within a time period of a completion operation (e.g., fracture operation) in the wellbore 106 (e.g., hours to 1-2 days). The well construction layer can be mechanically deformable with a relatively high stiffness but allowing for both elastic and permanent (i.e., plastic) deformation.

The well construction will deform (e.g., compress, bend, stretch) to conform to the deformation of the surrounding rock and to some degree by the fluid pressure inside the well casing. The well construction layer also creates a fluid seal (along with other components of the monitor wellbores 108b-108d) that completely or substantially seal a fluid (such as a liquid) within the mechanically deformable layer, such as within the wellbore tubular 155 (or the innermost concentric wellbore tubular 155 if more than one) and thus, within the respective wellbore 108b-108d. Therefore, a wellbore (or section of wellbore) that includes such a mechanically deformable layer can be a sealed wellbore (or sealed section of a wellbore) as used in the present disclosure. In some aspects, a substantial seal can occur when, during a treatment process that forms one or more of the treatment fractures 112, the amount of fluid pressure change related to fluid mass change in the wellbore 108b-108d is insubstantially relative to the fluid pressure change related to a change in interior tubular volume of the wellbore 108b-108d due to the deformation of the well construction layer.

In some aspects, data about the location of such fractures 112 and the wellbores 108b-108d and 106, such as locations of the wellbores, distances between the wellbores (e.g., in three dimensions) depth of horizontal portions of the wellbores, and locations of the hydraulic fractures initiated from the wellbores (e.g., based on perforation locations formed in the wellbores), among other information. In some aspects, such information (along with the monitored, induced pressure variations in a fluid in the one or more monitor wellbores) can be used to help determine one or more characteristics of the reservoir, as well as other features. For example, in addition to information about the subterranean zones 104a-104c, data about intersection of the hydraulic fractures 112 with one or more wellbores 108b-108d, proximity of tips of the hydraulic fractures 112 to the one or more wellbores 108b-108d can also be determined.

In the present disclosure, one or more features illustrated in FIGS. 1A-1C can be represented or defined as a control volume for the purpose of determining characteristics about that feature (and others) according to the present disclosure. For example, in some aspects, the wellbore 108b is represented or defined as a control volume. Such a control volume, for instance, can be approximated as a cylinder in shape. In this example, therefore, the wellbore 108b represents a sealed, fluid-filled cylinder bounded by the mechanically deformable layer (of the cement 150 and wellbore tubular 155) of this wellbore 108b. Here, the pressure sensor 114 (as shown) is positioned at a wellhead at the terranean surface 102.

As another example, wellbore 108c is represented or defined as a control volume (with the pressure sensor 114 positioned in fluid communication with fluid in the wellbore 108c). Such a control volume, for instance, can also be approximated as a cylinder (e.g., a non-straight or bended cylinder as befits a directional wellbore) in shape. In this example, therefore, the wellbore 108c represents a sealed, fluid-filled cylinder bounded by the mechanically deformable layer (of the cement 150 and wellbore tubular 155) of this wellbore 108c.

As another example, the sealed section 121 of wellbore 108d is represented or defined as a control volume. Such a control volume, since the cross sectional dimension of the cylinder can be estimated to be much smaller than the total length of the sealed section 121 and/or volume of the wellbore 108d, can be approximated as a cylinder in shape. In this example, therefore, the wellbore 108d represents a sealed, fluid-filled cylinder bounded by the deformable layer (of the cement 150 and wellbore tubular 155) of this wellbore 108d.

Figure 2:
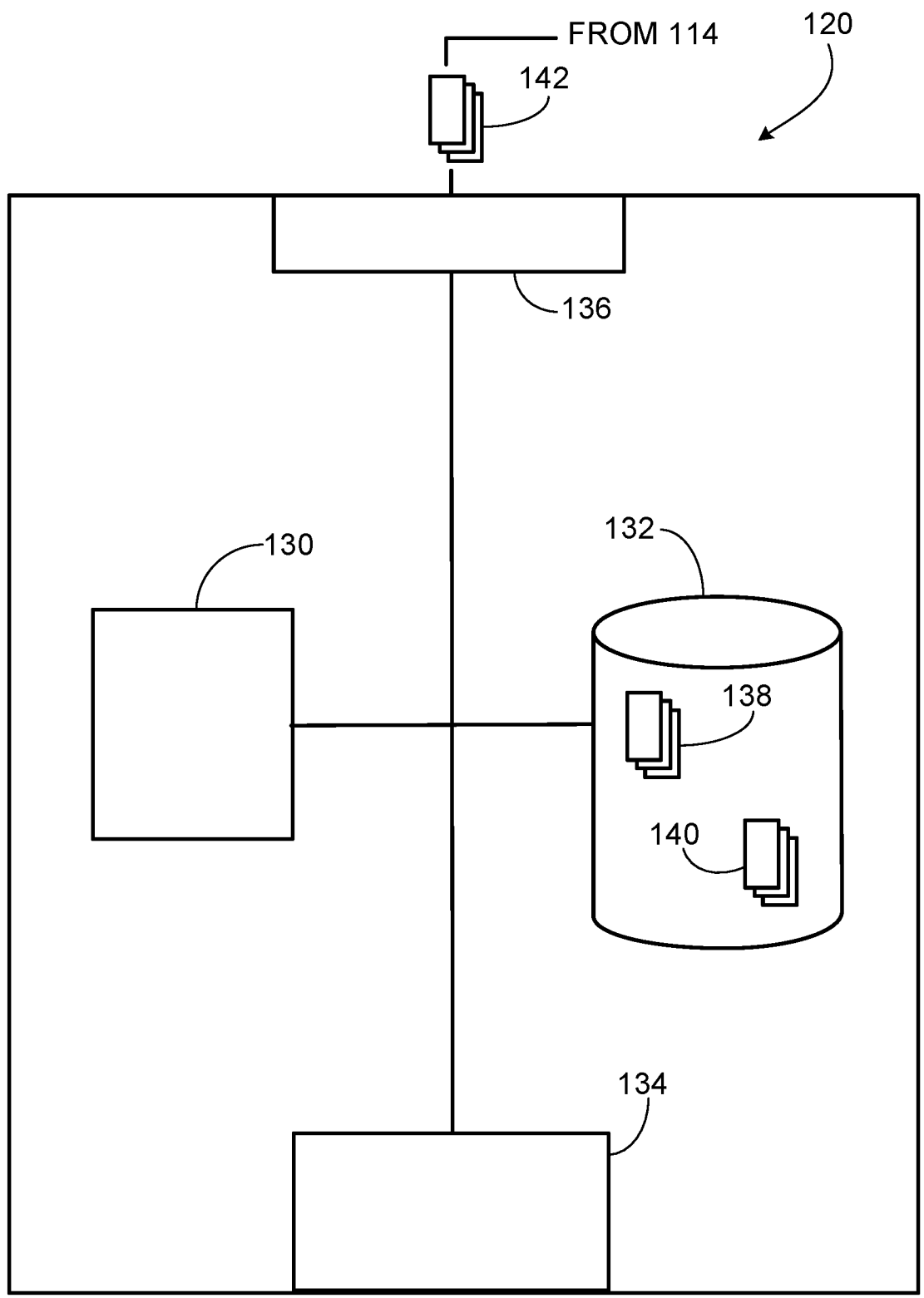
FIG. 2 is a schematic diagram of a structured data processing system that implements the reservoir modeling system.

FIG. 2 is a schematic diagram of a computing system that implements the reservoir modeling system 120 (structured data processing system) shown in FIGS. 1A-1C. Although illustrated as connected to the wellbore 108b only, generally, the reservoir modeling system 120 is capable of receiving or obtaining data from or related to any of the monitor wellbores 108b-108d (and pressure sensors 114 associated with each of these wellbores). Generally, the reservoir modeling system 120 includes a processor-based control system operable to implement one or more operations described in the present disclosure. As shown in FIG. 2, pressure signal values 142 can be received at the reservoir modeling system 120 from one or more pressure sensors 114 that is fluidly coupled to or in one or more of the monitor wellbores 108b-108d. The pressure signal values 142, in some aspects, can represent pressure variations in a fluid that is enclosed or contained in one or more of the monitor wellbores 108b-108d that are induced by a hydraulic fracturing fluid being used to form hydraulic fractures 112 from the treatment wellbore 106.

The reservoir modeling system 120 can be any computing device operable to receive, transmit, process, and store any appropriate data associated with operations described in the present disclosure. The illustrated reservoir modeling system 120 includes hydraulic fracturing modeling application 130. The application 130 is any type of application that allows the reservoir modeling system 120 to request and view content on the reservoir modeling system 120. In some implementations, the application 130 can be and/or include a web browser or desktop application. In some implementations, the application 130 can use parameters, metadata, and other information received at launch to access a particular set of data associated with the reservoir modeling system 120. Further, although illustrated as a single application 130, the application 130 can be implemented as multiple applications in the reservoir modeling system 120.

The illustrated reservoir modeling system 120 further includes an interface 136, a processor 134, and a memory 132. The interface 136 is used by the reservoir modeling system 120 for communicating with other systems in a distributed environment—including, for example, the pressure sensor 114—that can be connected to a network. Generally, the interface 136 comprises logic encoded in software and/or hardware in a suitable combination and operable to communicate with, for instance, the pressure sensor(s) 114, a network, and/or other computing devices. Such systems are often referred to in practice as data "historians." More specifically, the interface 136 can comprise software supporting one or more communication protocols associated with communications such that a network or interface's hardware is operable to communicate physical signals within and outside of the reservoir modeling system 120.

Regardless of the particular implementation, "software" can include computer-readable instructions, firmware, wired or programmed hardware, or any combination thereof on a tangible medium (transitory or non-transitory, as appropriate) operable when executed to perform at least the processes and operations described herein. Indeed, each software component can be fully or partially written or described in any appropriate computer language including C, C++, Java, Visual Basic, ABAP, assembler, Perl, Python, .NET, Matlab, any suitable version of 4GL, as well as others. While portions of the software illustrated in FIG. 2 are shown as individual modules that implement the various features and functionality through various objects, methods, or other processes, the software can instead include a number of sub-modules, third party services, components, libraries, and such, as appropriate. Conversely, the features and functionality of various components can be combined into single components as appropriate.

The processor 134 executes instructions and manipulates data to perform the operations of the reservoir modeling system 120. The processor 134 can be a central processing unit (CPU), a blade, an application specific integrated circuit (ASIC), a field-programmable gate array (FPGA), graphics processing unit (GPU), or another suitable component. Generally, the processor 134 executes instructions and manipulates data to perform the operations of the reservoir modeling system 120.

Although illustrated as a single memory 132 in FIG. 2, two or more memories can be used according to particular needs, desires, or particular implementations of the reservoir modeling system 120. In some implementations, the memory 132 is an in-memory database. While memory 132 is illustrated as an integral component of the reservoir modeling system 120, in some implementations, the memory 132 can be external to the reservoir modeling system 120. The memory 132 can include any memory or database module and can take the form of volatile or non-volatile memory including, without limitation, magnetic media, optical media, random access memory (RAM), read-only memory (ROM), removable media, or any other suitable local or remote memory component. The memory 132 can store various objects or data, including classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the reservoir modeling system 120.

The illustrated reservoir modeling system 120 is intended to encompass any computing device such as a desktop computer, laptop/notebook computer, wireless data port, smart phone, smart watch, wearable computing device, personal data assistant (PDA), tablet computing device, one or more processors within these devices, or any other suitable processing device. For example, the reservoir modeling system 120 can comprise a computer that includes an input device, such as a keypad, touch screen, or other device that can accept user information, and an output device that conveys information associated with the operation of the reservoir modeling system 120 itself, including digital data, visual information, or a GUI.

As illustrated in FIG. 2, the memory 132 stores structured or unstructured (e.g. raw text files with no predefined taxonomy) data, including one or more fluid-mechanical models 138. In some aspects, a fluid-mechanical model 138 describes fluid-mechanical interactions between, one or more of the hydraulic fractures 112, the subterranean formation 104a-104c, and one or more of one or more of the wellbores 108b or 108c, or the sealed section 121 of the wellbore 108d. Such fluid-mechanical interactions include, for example a combination of fluid mechanics, solid mechanics, and poromechanics. However, other data structures of the model 138 are contemplated by the present disclosure.

The fluid-mechanical interactions can be identified using fluid pressure measured by one or more pressure sensors 114 of a fluid contained in one or more of the monitor wellbores 108b-108d. The fluid-mechanical interactions can also be identified using one or more fluid pressure sensors or other components that measure a fluid pressure of a hydraulic fracturing fluid used to form the hydraulic fractures 112 from the treatment wellbore 106. In certain embodiments, the fluid pressure measurement includes a pressure versus time curve of the fluid pressure. Pressure-signals can be identified in the pressure versus time curve and the pressure-signals can be used to assess one or more characteristics of a reservoir. In some aspects, a "pressure-signal" refers to a recordable change in pressure of a first fluid within a control volume. The recordable change in the pressure of the first fluid, in some aspects, is caused by fluid-mechanical interactions in a subsurface formation originating from a second fluid used in a hydraulic stimulation process (e.g., a hydraulic fracturing process) in a treatment wellbore 106 in proximity to (e.g., adjacent) the control volume, where the second fluid is not in direct fluid communication with the first fluid (i.e., no mass flux change in the first fluid due to the second fluid). In some aspects, a fluid-mechanical model 138 can be in the form of a fluid pressure transfer function (or functions) between the fluid pressure signals identified from the first fluid and fluid pressure signals recorded in the second fluid.

For example, with reference to monitor wellbore 108b-108d, a fluid pressure signal can occur in the pressure sensor 114 positioned within the wellbore of (or attached to) the monitor wellbores 108b-108d. Since no significant fluid mass exchange can occur (due to the fluidly impermeable well construction layer) and the temperature of fluid is considered to be stable, the primary cause of the recordable pressure signal is the change of interior wellbore volume due to deformation of the wellbore construction material. The change in the stress-field and deformation of the subterranean formation adjacent the well construction material can be caused by a hydraulic pressure exerted by a secondary fluid (e.g., a hydraulic fracturing treatment fluid) on the fracture surface of the treatment fractures 112 and a leak-off of treatment fluid that causes fluid pressure changes within the pores and fractures and faults in the subterranean formation. The change in stress field and formation of the rock can cause the monitor wellbore (108b-108d) to deform, since the deformation of the surrounding rock and the monitor wellbore will conform. This deformation of the wellbore, i.e., change in the interior volume of the monitor wellbore, can result into a recordable pressure-signal by the pressure sensor 114.

Fluid pressure signals recorded from monitors wells 108b-108d can be smaller in nature compared to fluid pressure signals recorded from perforated wellbores (e.g., treatment wellbore 106), where the perforations can allow for direct fluid communication (e.g., a direct pressure signal induced by direct fluid communication such as a direct fracture hit or fluid connectivity through a high permeability fault). The fluid pressure signals in monitor wells 108b-108d manifest without delay with respect to the wellbore deformation. However, the deformation, or volume change, of the wellbore (108b-108d) can manifest itself with delay with respect to the fracture treatment depending on the type of fluid-mechanical interaction most prevalent in the subterranean zone. For example, when the rock deformation around the monitor wells is predominantly undrained rock deformation by the stress field induced by the treatment pressure (second fluid) acting on the fracture surface in fracture(s) 112, the pressure transfer can show little delay (including elastic snapbacks/unloading). This in contrast to a situation where the rock deformation around the monitor well is predominantly due to fluid pressurization caused by an increase in pore-pressure due to leak-off of hydraulic fracturing treatment (secondary) fluid and migration of formation fluid, which can result in a delayed and longer lasting pressure signal in the monitor well. Each of these effects, namely, undrained rock deformation and fluid pressurization can be characteristics of the reservoir that can be determined based at least in part on the fluid pressure signals in monitor wells 108b-108d. In determining such characteristics, other features of the reservoir or of the wellbores (106, 108b-108d) or fractures (112) can be determined.

In some aspects, a combination of both effects can be observed. A part of a pressure signal predominately governed by undrained rock deformation, can be used, at least in part, to determine certain features, such as hydraulic fracture geometry (e.g., binary information such as whether the hydraulic fracture from a treatment wellbore cross an inter-well spacing between a monitor wellbore and the treatment wellbore), fracture growth rate (e.g., how fast in terms of time, treatment fluid barrels pumped, etc., before growing past a monitor wellbore), and number of treatment fractures crossing a monitor well. A part of a pressure signal predominantly governed by fluid pressurization (also called fluid migration), can be used, at least in part, to determine certain features, such as effective hydraulic connectivity (resistance) in the reservoir (relative), as well as rate of leak-off into the subterranean zone. In some aspects, a pressure signal may definitively show that one, rather than the other, effect is present in the reservoir. In some aspects, a pressure signal may show that both effects are present in the reservoir. In some aspects, a pressure signal may not definitively show that either effect is present in the reservoir.

With reference to monitor wellbore 108b, a fluid pressure signal can occur in the pressure sensor 114 attached to the wellhead of the monitor wellbore 108b when the adjacent treatment wellbore 106 undergoes hydraulic stimulation. A particular hydraulic fracture 112 emanating from the treatment wellbore 106 can grow in proximity to the wellbore 108b, but these fractures 112 may or may not intersect and/or overlap the wellbore 108b. No fluid from the hydraulic fracturing process in the treatment wellbore 106 contacts any fluid in the wellbore 108b (i.e., as a sealed wellbore) and no measurable pressure change in the fluid in the wellbore 108b is caused by advective or diffusive mass transport into the wellbore 108b related to the hydraulic fracturing process in the treatment wellbore 106. The change in stress on a rock (in the subterranean zone 104) due to undrained rock compression, fluid migration, or both, in contact with the wellbore casing 155 will impose a traction on the wellbore casing, resulting in (elastic or permanent) casing deformation/compression, altering the contained volume of the casing and compressing the fluids in the wellbore 108b, which can be measured as a pressure-signal in the pressure sensor 114 fluidly coupled to the wellbore 108b.

With reference to monitor wellbore 108c, a pressure-induced (fluid pressure) mechanic signal can occur in the pressure sensor 114, e.g., within the monitor wellbore 108c, when the adjacent treatment wellbore 106 undergoes hydraulic stimulation, resulting from wellbore deformation induced by fluid-mechanical response of the surrounding reservoir. A particular hydraulic fracture 112 emanating from the treatment wellbore 106 can grow in proximity to the wellbore 108c, but these fractures 112 may or may not intersect and/or overlap the wellbore 108c. No fluid from the hydraulic fracturing process in the treatment wellbore 106 contacts any fluid in the wellbore 108c and no measurable pressure change in the fluid in the wellbore 108c is caused by advective or diffusive mass transport related to the hydraulic fracturing process into the treatment wellbore 106. Thus, the direct fluid interaction of the fluids in the hydraulic fracture 112 with fluids in the subsurface matrix does not result in a recordable pressure change in the fluids in the monitor wellbore 108c that can be measured by the pressure sensor 114. The change in stress on a rock (in the subterranean zone 104) due to undrained rock compression, fluid migration, or both, in contact with the fluids in the fracture 112, however, can cause a change in pressure in the fluids in the wellbore 108c, which can be measured as the pressure-induced (fluid pressure) mechanic signal in the pressure sensor 114.

With reference to monitor wellbore 108d, a pressure-induced (fluid pressure) mechanic signal can occur in the pressure sensor 114 mounted in fluid communication with the sealed section 121 of the monitor wellbore 108d when the adjacent treatment wellbore 106 undergoes hydraulic stimulation, resulting from wellbore deformation induced by fluid-mechanical response of the surrounding reservoir. A particular hydraulic fracture 112 emanating from the treatment wellbore 106 can grow in proximity to the wellbore 108d, but these fractures 112 may not intersect and/or overlap the sealed section 121 of the wellbore 108d. No fluid from the hydraulic fracturing process in the treatment wellbore 106 contacts any fluid in the sealed section 121 of the wellbore 108d and no measureable pressure change in the fluid in the wellbore 108d is caused by advective or diffusive mass transport related to the hydraulic fracturing process in the treatment wellbore 106. Thus, the interaction of the fluids in the hydraulic fracture 112 with fluids in the subsurface matrix does not result in a recordable pressure change in the fluids in the monitor wellbore 108c that can be measured by the pressure sensor 114. The change in stress on a rock (in the subterranean zone 104) due to undrained rock compression, fluid migration, or both, in contact with the fluids in the fracture 112, however, can cause a change in pressure in the fluid in the sealed section 121 of the wellbore 108d, which can be measured as the pressure-induced (fluid pressure) mechanic signal in the pressure sensor 114 (i.e., mounted in fluid communication with the sealed section 121).

Figure 3:
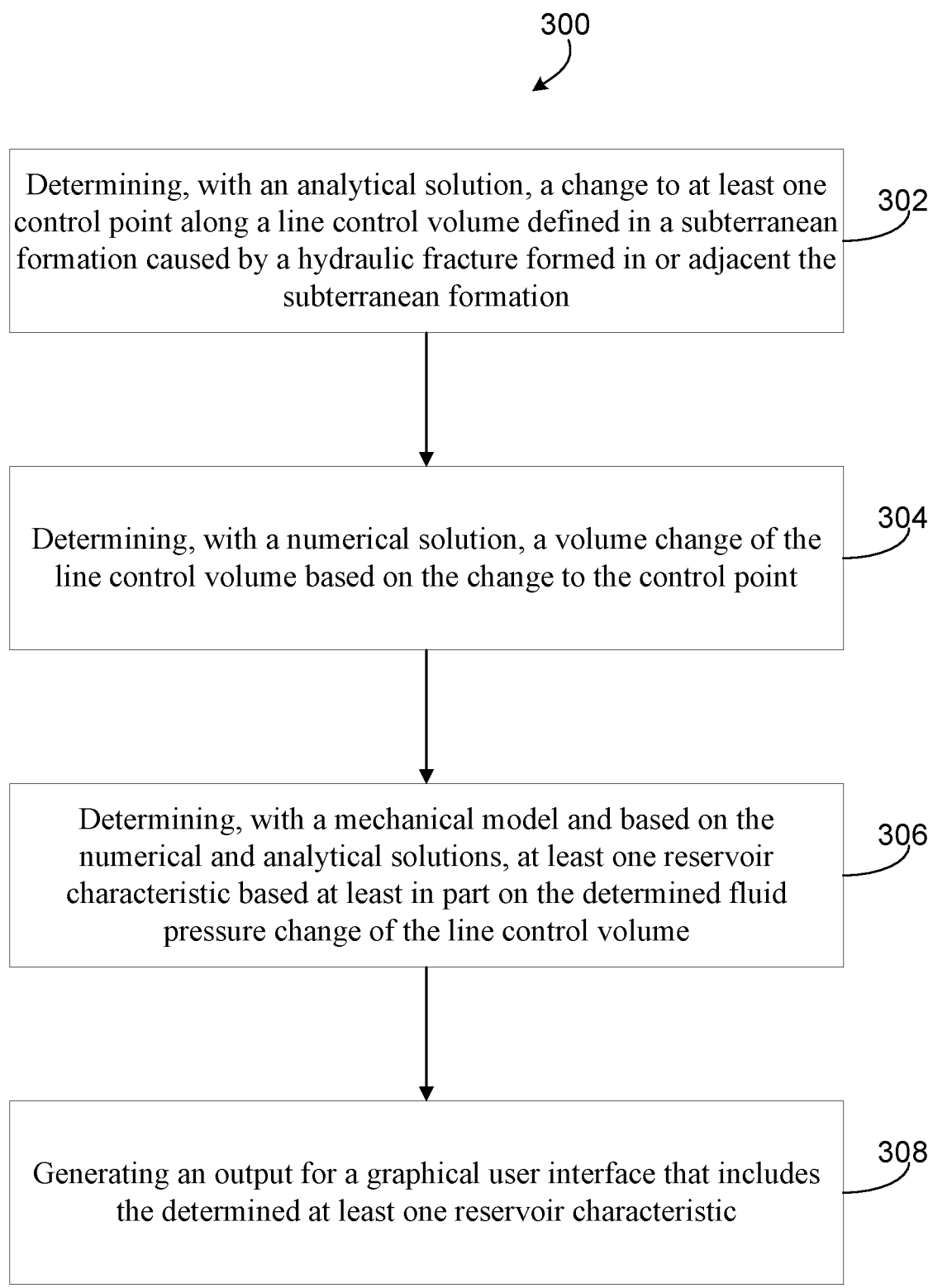
FIG. 3 is a flowchart that describes an example method for determining one or more characteristics of a reservoir with a reservoir modeling system.

FIG. 3 is a flowchart that describes an example method 300 for determining one or more characteristics of a reservoir with a reservoir modeling system, such as reservoir modeling system 120 shown in FIGS. 1A-1C and 2. In some aspects, method 300 can be implemented in real-time during a hydraulic fracturing treatment in a treatment wellbore. "Real-time" (or "real time," "realtime," "real (fast) time (RFT)," "near(ly) real-time (NRT)," "quasi real-time," or similar terms (as understood by one of ordinary skill in the art)), for the purposes of the present disclosure, means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit (or a combination of these or other functions) the data.

Method 300 can begin at step 302, which includes determining, with an analytical solution, a change to at least one control point along the line control volume defined in a subterranean formation caused by a hydraulic fracture formed in or adjacent the subterranean formation. The analytical solution, in some aspects, can be a closed-form solution to a boundary value problem in terms of a mathematical framework that calculates the exact solution and involves no spatial or time discretization. In some aspects, as part of the method 300, the analytical solution can provide a solution for a first, or primary boundary value problem.

For example, an analytical solution executed by the hydraulic fracture modeling system 120 can, generally, derive properties at multiple control points along a sealed wellbore or sealed section of a wellbore, both of which can be represented by a line-like trajectory. Each control point, in some aspects, can be a point in a spatial domain (i.e., in a subterranean formation) for which an analytical solution is evaluated, and for which the calculated numerical value is introduced to a numerical solution as a boundary condition.

In some aspects, the control point can be multiple control points that describe displacements of a boundary of a particular control volume (e.g., sealed wellbore or sealed wellbore section) of a monitor wellbore. Thus, changes to the one or more control points describe or define a displacement field that assigns a displacement vector to all points within the spatial domain (i.e., the control volume). A displacement vector, in some aspects, can represent a change in spatial position of a material point (e.g., a control point) with respect to a reference state (e.g., undeformed configuration). Each control point represents an incremental, three-dimensional displacement of a "point" of rock that lies on the boundary of the particular control volume. The displacement of each control point, in some aspects, is caused by the mechanic interaction of the point due to fracturing of a treatment wellbore that induces a hydraulic fracture that emanates from the treatment wellbore.

In another example, the control point can be multiple control points that describe stress on a boundary of a particular control volume (e.g., sealed wellbore or sealed wellbore section) of a monitor wellbore. Thus, changes to the one or more control points describe or define a stress field that assigns a stress tensor to all points within the spatial domain (i.e., the control volume). A stress tensor, in some aspects, can represent a second order spatial tensor representative of "internal" material stresses acting on an infinitesimal small volume that can satisfy local linear and angular equilibriums. In some cases, the stress tensor is governed by constitutive equations that relate the stress tensor to physical quantities, e.g., strain (rate), fluid pressure, etc., and which can be time dependent, history dependent, and non-local. Each control point represents an incremental, three-dimensional stress on a "point" of rock that lies on the boundary of the particular control volume. The stress of each control point, in some aspects, is caused by the mechanic interaction of the point due to fracturing of a treatment wellbore that induces a hydraulic fracture that emanates from the treatment wellbore.

In another example, the control point can be multiple control points that describe strain on a boundary of a particular control volume (e.g., sealed wellbore or sealed wellbore section that is represented by a line-like control volume) of a monitor wellbore. Thus, changes to the one or more control points describe or define a strain field that can be a spatial gradient, or strain tensor, of a displacement field within the spatial domain (i.e., the control volume). A strain tensor, in some aspects, can be the derivative of a displacement field at the control point. Each control point represents an incremental, three-dimensional strain on a "point" of rock that lies on the boundary of the particular control volume. The strain of each control point, in some aspects, is caused by the mechanic interaction of the point due to fracturing of a treatment wellbore that induces a hydraulic fracture that emanates from the treatment wellbore.

In another example, the control point can be multiple control points that describe traction of a boundary of a particular control volume (e.g., sealed wellbore or sealed wellbore section) of a monitor wellbore. Thus, changes to the one or more control points describe or define a traction field that assigns a traction vector to all points on a two-dimensions surface within a spatial domain (i.e., the control volume). A traction vector, in some aspects, can be an internal material force acting on the infinitesimally small two-dimensional surface within the spatial domain. Thus, in some aspects, the traction vector can be the component of the stress tensor that is acting on a surface with a certain orientation. Each control point represents an incremental, three-dimensional traction on a "point" of rock that lies on the boundary of the particular control volume. The traction of each control point, in some aspects, is caused by the mechanic interaction of the point due to fracturing of a treatment wellbore that induces a hydraulic fracture that emanates from the treatment wellbore.

In some aspects, the analytical solution includes or is based on a modified Eshelby solution. For example, an analytical solution based on a modified Eshelby solution is described in Meng et al., "Evaluation of the Eshelby Solution for the Ellipsoidal Inclusion and Heterogeneity," Stanford Rock Fracture Project, vol. 22, 2011, pp. C-1 through C-10 (hereinafter, "Meng").

For instance, in some aspects of step 302, the analytical solution includes the determination of a displacement field (i.e., control points) on the boundary of the particular control volume. For a sealed wellbore or sealed wellbore section, the control volume can approximate a cylinder (or a line, as the length of approximated cylinder is much greater than a diameter of the approximated cylinder). Thus, for such three dimensional control volumes, the displacement field determined in the analytical solution can include multiple control points.

In some aspects of step 302, the displacement field can be determined or written as:

$$u_i(x) = f_i(\text{Dim}_{treatfrac}, \text{vec}, \text{rot}, \text{geo}, P\text{net}) \quad (1),$$

where $u_i(\text{vec})$ is the displacement field (i.e., multiple control points each represented by $u_i(\text{vec})$ as i=1 to i=3). Thus, in this example, the displacement field, generally, is a function of one or more dimensions of the treatment fracture ($\text{Dim}_{treatfrac}$), a vector between the control volume and the treatment fracture (vec), a spatial orientation of the treatment fracture in relation to the control volume (rot), one or more geologic properties of the subterranean formation (geo), and a net Pressure (distribution) imposed on the fracture surface (Pnet). In some aspects, one or more of the parameters provided in this function may not be used or needed, such as, for example, the geo and/or rot terms. Thus, in some aspects, this equation can reduce to:

$$u_i(\text{vec}) = f_i(\text{Dim}_{treatfrac}, \text{vec}, P\text{net}) \quad (2).$$

A more specific example of an analytical solution for the displacement field is found in Meng:

$$u_i(x) = \frac{1}{8\pi(1-v)}(\psi_{,jli}\epsilon_{jl^*} - 2v\epsilon^*_{mm}\phi_{,i} - 4(1-v)\epsilon^*_{ij}\phi_{,j}), \quad (3)$$

where $u_i(x)$ represents the displacement field (i.e., the one or more control points) of the control volume, $\epsilon^*$ is the Eigenstrain, $v$ is Poisson's ratio, and W and (are given by $$\Phi(x) = \int_\Omega |x-x'| dx', \text{ and } \Psi(x) = \int_\Omega \frac{1}{|x-x'|} dx'.$$

Here, the Eigenstrain is the (constant) strain of, e.g., an ellipsoidal treatment fracture. For example, the Eigenstrain is the strain of the inclusion (e.g., the fracture volume). For an elliptical inclusion, this strain can be homogeneous (e.g., constant) within the inclusion. The strain field around the inclusion can be proportional to the inclusion but dependent on the distance (vec) and the orientation (rot) with respect to the treatment fracture. The same can hold true for the displacement field. The displacement field around the inclusion (e.g., Eq. 3) can also be proportional to the Eigenstrain and dependent on (vec and rot) through $\Phi$ and $\Psi$.

Alternatively, in step 302, the strain field can be determined and written as:

$$\epsilon_{ij}(x) = g_{ij}(\text{Dim}_{treatfrac}, \text{vec}, \text{rot}, \text{geo}, P\text{net}) \quad (4).$$

Here, the general function $g_{ij}$ can be represented by the spatial gradient of the general function $f_i$.

Method 300 may continue at step 304, which includes determining, with a numerical solution, a volume change of the line control volume based on the change to the control points. In some aspects, the numerical solution is a secondary (or second) boundary value problem (with the analytical solution being a solution to a first or primary boundary value problem) of the volume change and consequently (fluid) pressure change of the control volume. The numerical solution includes a (fluid) pressure change of the control volume that can be determined, for example, by perturbing the bore-hole cavity from reservoir rock material to concentric layers of the casing construction material (e.g., cement and steel casing) around a fluid core. The casing construction material can be represented by a linear elastic material (e.g., Young's modulus and Poisson's ratio), and for the fluid in the wellbore, an effective (e.g., wellbore average) fluid compressibility is considered. The numerical solution, in some aspects, can allow for the mechanical equilibrium to be satisfied (restored), thereby providing the value for the change in (fluid) pressure in the control volume. The secondary boundary value problem can be constructed such that the values determined at the control point (or points) serve as a boundary condition (or conditions). In some aspects, a numerical solution is distinct from an analytical solution in that the numerical solution can be an approximated solution of the boundary value problem derived from a spatial and/or time discretization; the solution converges to the exact solution upon refinement of the discretization.

For example, once the at least one control point (e.g., displacement field) is determined in step 302, a secondary boundary value problem is constructed such that (at least one) of its boundary conditions is controlled by the displacement field evaluated at the control points. The numerical solution (rather than the analytical solution) is executed to determine the (fluid) pressure change in the control volume based at least in part on the mechanic interaction of the displacement field due to fracturing of the treatment wellbore that induces the hydraulic fracture that emanates from the treatment wellbore. Generally, step 304 includes calculating a numerical solution to determine a (fluid) pressure change in the control volume.

In another aspect of step 304, the secondary boundary value problem (i.e., the numerical solution) can be constructed such that a stress field serves as a boundary condition. The numerical solution can thus determine the (fluid) pressure change of the control volume based on the evaluated stress tensors determined at the control point based on the analytical solution of the first boundary value problem.

In another aspect of step 304, the secondary boundary value problem (i.e., the numerical solution) can be constructed such that a strain field serves as a boundary condition. The numerical solution can thus determine the (fluid) pressure change of the control volume based on the evaluated strain tensors determined at the control point based on the analytical solution of the first boundary value problem.

In another aspect of step 304, the secondary boundary value problem (i.e., the numerical solution) can be constructed such that a traction field serves as a boundary condition. The numerical solution can thus determine the (fluid) pressure change of the control volume based on the evaluated traction vectors determined at the control point based on the analytical solution of the first boundary value problem.

Method 300 may continue at step 306, which includes determining, with a mechanical model and based on the numerical and analytical solutions, at least one characteristic of the reservoir based at least in part on the determined fluid pressure change of the control volume. For example, the hydraulic fracture modeling system 120 can, generally, execute a comparison of the fluid pressure change of the control volume of the monitor wellbore (i.e., the modeled fluid pressure change) with an observed pressure, i.e., as recorded by a pressure sensor in fluid communication with the control volume of the monitor wellbore. For example, in some aspects, modeled dimensions of the control volume can be associated with particular modeled pressures, e.g., in a mechanical model of the hydraulic fracture modeling system 120. As the modeled fluid pressure change (from step 304) approaches, exceeds, or equals the observed pressure taken by the pressure sensor of the monitor wellbore, a feature or dimension of the control volume is determined. In some aspects, a dimension of the control volume can, in turn, be used to determine a characteristic (e.g., a wellbore compression effect) of the reservoir into which the treatment wellbore is formed.

In some aspects, the mechanical model takes into account the well construction, which includes, for example, one or more casings (or other wellbore tubulars) and one or more cement layers that separate a control volume of the monitor wellbore from the subterranean formation. In other words, the well construction separates the free rock surface created by drilling the wellbore in the reservoir from a fluidic mass inside the well casing (or other tubular). Other components that can comprise the well construction include, for example, liners, packers, plugs, or other set tools in the wellbore that separate the free rock surface from the fluidic mass.

In the mechanical model, the rock can be modeled as a fully coupled pore-mechanical material or simplified to a linear elastic (undrained) material, which is intersected by the wellbore construction. For the mechanical model, the well construction is assumed to consist of concentric cylinders. Each of the individual cylinders is assumed to be of homogeneous thickness and to consist of linear elastic material (e.g., representative of the casing steel, cement, etc.). In general, the number and composition of the concentric cylinders can vary over different sections of the monitor well. For example, a vertical part of the monitor well trajectory can have more cylinder layers and of larger diameters in comparison to the horizontal section of the monitor wellbore. An interface (e.g., threaded or otherwise) between the concentric cylinders can be assumed to be perfectly cohesive (e.g., no displacement discontinuities) or perfect slip (no normal displacement discontinuity and leaving transverse displacement discontinuities unrestricted). Moreover, the interface between an outside cylinder (e.g., a cement layer) and the rock surface again can be assumed to be perfectly cohesive. In the mechanical model, a cavity of the casing volume is assumed to be filled with a compressible fluid, which imposes a normal traction (pressure $p_c(TVD)$) on the casing internal surface.

$$C_{eff} = \frac{1}{V_{well}} \sum_{i=1}^{n} C_i V_i \text{ with } V_{well} = \sum_{i}^{n_p} V_i. \quad (5)$$

Here $V_{well}$ is the total in-casing volume of the sealed wellbore (or sealed wellbore section), Vi is the volume of the constituent i with compressibility $C_i$, and density $\rho_{i,p}$ at pressure p. Since the monitor wellbore is in a (static) state of equilibrium, the combined compressibility of all fluid phases, $n_p$, needs to be considered to get the effective compressibility. Thus, Eq. 5 recognizes that the sealed wellbore or sealed wellbore section may have multiple fluids (gas, liquid, multi-phase) that together comprise the compressible fluid within the monitor wellbore. Thus, Eq. 5 calculates an effective compressibility ($C_{eff}$) of the compressible fluid by a sum of the products of the compressibility and volume of each individual fluid divided by a total volume of the sealed section or sealed wellbore section ($V_{well}$).

The fluid in the sealed section of the monitor wellbore can also be assumed to be static (e.g., no velocity); therefore pressure gradients can only arise from gravity, which makes such gradients a function of true vertical depth (TVD). In-casing pressure, therefore, can be understood to be comprised of two components of (i) the hydraulic head (fluid column above the gauge) and (ii) the volumetric pressure, i.e., $p_{total} = p_{head} + p_{vol}$. The hydraulic head can be governed by a (true vertical) depth z of the gauge and the density of the fluid column above the gauge, $p_{head} = \int_{z_{gauge}}^{z_{surface}} g \cdot \rho(z) \, dz$, where g is the gravitational constant and ρ is the density of the fluid at true vertical depth, z. If the fluid column height and composition are not changing, the hydraulic head will be constant. Note that in case of a gas cap, the density, ρ, over the z-range where the gas is, can be low compared to the density of a hydraulic column.

The volumetric pressure is the component of the pressure resulting from actual compression of the fluid in the wellbore or the well volume itself. The change in volumetric pressure $\delta p_{vol}$ is (i) inversely proportional to the effective compressibility $C_{eff}$ and proportional to the effective stiffness $K_{eff}$ of the fluid $C_{eff} = 1/K_{eff}$, and proportional to (ii) a relative change in well volume $\delta V_{well}/V_{well}$, and (iii) fluid mass in/out-flux $\delta m_i$ from the well volume. In some aspects, it can be assumed that no phase transitions and constant temperature (no thermal expansion) are being considered in this relation. The change in volumetric pressures reads $$\delta p_{vol} = \frac{K_{eff}}{V_{well}} \left( \delta V_{well} + \frac{\delta m_i}{\rho_{i,p}} \right) = \frac{1}{C_{eff} V_{well}} \left( \delta V_{well} + \frac{\delta m_i}{\rho_{i,p}} \right). \quad (6)$$

In case no appreciable mass exchange $\delta m_i \approx 0$ exist and no phase transitions occur, the principle driver for fluid pressure change in the monitor wellbore is the change of (interior) casing volume $\delta V_{well}$ or the change of temperature on a part or along the full well trajectory. The heat capacity of the reservoir is significantly large to disregard the latter, therefore, for the remainder only casing volume change is considered, which is a result of casing deformation, primary wellbore compression.

In order to quantify the interior wellbore change, $\delta V_{well}$ is quantified by:

$$\delta V_{well} = \int_{head}^{bottom} \oint_{\Gamma_c} \delta \vec{u}_c(md) \cdot \vec{N}_c d\Gamma \, dmd \text{ or similar,} \quad (7)$$

$$\delta V_{well} = \frac{\pi}{4} \int_{head}^{bottom} ID(md)^2 |\delta \varepsilon_c|(md) \, dmd, \quad (8)$$

where Eq. 7 expresses the volume change in terms of displacement ($\delta \vec{u}_c$) of the interior surface ($\Gamma_c$) of the casing relative to the normal of that casing surface ($\vec{N}_c$). Eq. 8 uses an alternative definition for $\delta V_{well}$ expressed by volumetric strain of the internal casing $|\varepsilon_c|(md)$ and, $ID(md)$ is the original internal diameter of the casing at measured depth md. The integral ranges from well head to the bottom of the well.

In the mechanical model of the example implementation, the wellbore deformation response can be estimated by two consecutive quasi-static deformation steps. Therefore, a superposition of the first and second deformation response would represent the full deformation response of the (interior) well casing $V_{well} = \langle V_{well} \rangle^1 + \langle V_{well} \rangle^2$ defined by the displacement field, $\vec{u}_c = \langle \vec{u}_c \rangle^1 + \langle \vec{u}_c \rangle^2$, or strain field, $\varepsilon_c = \langle \varepsilon_c \rangle^1 + \langle \varepsilon_c \rangle^2$.

The first boundary value problem (e.g., the analytical solution) takes into account the hydraulic fracture and, for example, calculates displacement or strain or both, in the control point, j, along a virtual well trajectory of the monitor wellbore. In some aspects, the analytical solution calculates the reservoir deformation as a response to the hydraulic fracture, and does not include the fine scale details of the monitor well construction material. Based on the displacement or strain (or both) this can impose on the virtual cylindrical well construction a first response in the casing reference pressure:

$$\langle \delta p_{vol} \rangle^1 = \frac{(\delta V_{well})^1}{V_{well} C_{eff}} \approx \frac{1}{V_{well} C_{eff}} \sum_{j=1}^{n_c} w_j \langle \delta \vec{u}_c \rangle_j^1 \cdot \vec{N}_{c,j} \text{ or} \quad (9)$$

$$\langle \delta p_{vol} \rangle^1 = \frac{(\delta V_{well})^1}{V_{well} C_{eff}} \approx \frac{1}{V_{well} C_{eff}} \sum_{j=1}^{n_c} w_j ID_j \langle \delta |\varepsilon_c| \rangle_j^1. \quad (10)$$

In this example, $n_c$ is the number of control points along the trajectory of the monitor wellbore and $w_j$ is a weight factor of control point, $\vec{u}_c$ and $\varepsilon_c$, are determined by the analytical solution.

The second boundary value problem can take into account the load imposed on the deformed wellbore from the analytical solution and tends to restore the un equilibrated local stress, that resulting in the first step from not taking into account the perturbation of well construct properties from the reservoir properties. Solving the second boundary value problem with result in a second step of well bore deformation $\langle \delta V_{well} \rangle^2$. In some aspect, a secondary boundary value can be constructed an solved for every control point or group of control points $n_c$. Subsequently, the well bore deformation $\langle \delta V_{well} \rangle^2$ and associated secondary wellbore pressure response $\langle \delta p_{vol} \rangle^2$ for the second step can be calculated by $$\langle \delta p_{vol} \rangle^2 = \frac{\langle \delta V_{well} \rangle^2}{V_{well} C_{eff}} \approx \frac{1}{V_{well} C_{eff}} \sum_{k=1}^{n_{bvp}} w_k ID_k \langle \delta |\varepsilon_c| \rangle_k^2. \quad (10)$$

In this relation, the change in wellbore volume for step two $\langle \delta V_{well} \rangle^2$ can either be taken directly from the solution of a single secondary boundary value problem solution, or estimated by the weighted summation over the volumetric strain calculated by each of the $n_{bvp}$ secondary boundary value problems.

To complete the numerical solution(s), the stress or strain (or both) determined in the control point(s) from the analytical solution is imposed. This can be done by introducing a traction (e.g., both transverse and normal) to an interface between the external cylinder (e.g., a cement layer in most well constructions) and the rock formation, causing a traction discontinuity as an initial condition of the boundary value problem. This traction, $\vec{t}_{(md,\theta)}$, can be interpolated between the control points (defined at $md_i$) along the monitor wellbore trajectory measured depth md, in order to provide a continuous traction along the well construction/rock-interface. The traction represents the imbalance in local stress equilibrium that will arise from replacing the well construction volume, that in the analytical solution is represented by the rock, with the actual well construction material in the numerical solution. As described, this replacement can be performed in the initiation of the numerical solution of step 304. In the solution of the numerical solution of step 304, the traction discontinuity is resolved.

As part of the mechanical model, a second pressure response of the reference casing pressure, $\langle \delta p_{vol} \rangle^2$ is calculated. After calculation of the first and second pressure response, the superposition can be completed yielding the estimated full pressure response. Subsequently, this calculated fluid pressure can then be compared to a pressure response (e.g., a pressure change due to a treatment that generates hydraulic fracture(s) 112) measured by an actual recorded pressure (field data) on the monitor wellbore.

The reservoir characteristic determined in step 306 can include one or more reservoir effects, for example, the determination of an undrained rock deformation effect, the determination of a fluid pressurization effect, or a combination of both. Each of these effects can be characteristics of the reservoir that can be determined based at least in part on the determined fluid pressure change of the control volume. In determining such characteristics, other features of the reservoir or of the wellbores (106, 108b-108d) or fractures (112) can be determined. For example, a part of a pressure signal predominately governed by undrained rock deformation, can be used, at least in part, to determine certain features, such as hydraulic fracture geometry, e.g., binary information such as whether the hydraulic fracture from a treatment wellbore cross an inter-well spacing between a monitor wellbore and the treatment wellbore. The part of the pressure signal predominately governed by undrained rock deformation can also be used to determine fracture growth rate (e.g., how fast in terms of time, treatment fluid barrels pumped, etc., before growing past a monitor wellbore). The part of the pressure signal predominately governed by undrained rock deformation can also be used to determine number of treatment fractures crossing a monitor well. A part of a pressure signal predominantly governed by fluid pressurization (also called fluid migration), can be used, at least in part, to determine certain features, such as effective hydraulic connectivity (resistance) in the reservoir (relative), as well as rate of leak-off into the subterranean zone. In some aspects, a pressure signal may definitively show that one, rather than the other, effect is present in the reservoir. In some aspects, a pressure signal may show that both effects are present in the reservoir. In some aspects, a pressure signal may not definitively show that either effect is present in the reservoir.

Method 300 may continue at step 308, which includes generating an output for a graphical user interface that includes the determined at least one reservoir characteristic. In some aspects, the output can be generated for multiple control volumes as method 300 is repeated for multiple monitor wellbores or multiple control volumes for a single monitor wellbore.

The features described can be implemented in digital electronic circuitry, or in computer hardware, firmware, software, or in combinations of them. The apparatus can be implemented in a computer program product tangibly embodied in an information carrier, for example, in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touch-screen flat-panel displays and other appropriate mechanisms.

The features can be implemented in a control system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

While this specification contains many specific implementation details, these should not be construed as limitations on the scope of any inventions or of what can be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications can be made without departing from the spirit and scope of the disclosure. For example, example operations, methods, or processes described herein may include more steps or fewer steps than those described. Further, the steps in such example operations, methods, or processes can be performed in different successions than that described or illustrated in the figures. Accordingly, other implementations are within the scope of the following claims.

What is claimed is:

1. A computer-implemented method, comprising:
    determining, with an analytical solution executed by one or more hardware processors, a change to at least one control point of a boundary of a control volume defined in a subterranean formation, the change to the at least one control point caused by a hydraulic fracture formed in or adjacent the subterranean formation;
    determining, with a numerical solution executed by the one or more hardware processors, a fluid pressure change of the control volume based on the change to the at least one control point; and
    determining, with a mechanical model generated by the one or more hardware processors based on the analytical solution and the numerical solution, at least one reservoir characteristic based at least in part on the determined fluid pressure change of the control volume.

2. The computer-implemented method of claim 1, wherein the change to the at least one control point comprises a stress field.

3. The computer-implemented method of claim 2, wherein determining the fluid pressure change of the control volume based on the change to the at least one control point comprises:
    evaluating, with the one or more hardware processors, a stress tensor of the stress field; and
    determining, with the one or more hardware processors, the fluid pressure change of the control volume based on the evaluation of the stress tensor.

4. The computer-implemented method of claim 2, wherein the at least one control point defines at least one stress on the boundary of the control volume.

5. The computer-implemented method of claim 4, wherein the at least one control point comprises a plurality of control points that define the stress field.

6. The computer-implemented method of claim 1, wherein the change to the at least one control point comprises a strain field.

7. The computer-implemented method of claim 6, wherein determining the fluid pressure change of the control volume based on the change to the at least one control point comprises:
    evaluating, with the one or more hardware processors, a strain tensor of the strain field; and
    determining, with the one or more hardware processors, the fluid pressure change of the control volume based on the evaluation of the strain tensor.

8. The computer-implemented method of claim 6, wherein the at least one control point defines at least one strain on the boundary of the control volume.

9. The computer-implemented method of claim 8, wherein the at least one control point comprises a plurality of control points that define the strain field.

10. The computer-implemented method of claim 1; wherein the change to the at least one control point comprises a traction field.

11. The computer-implemented method of claim 10, wherein determining the fluid pressure change of the control volume based on the change to the at least one control point comprises:
evaluating, with the one or more hardware processors, a traction vector of the traction field; and
determining, with the one or more hardware processors, the fluid pressure change of the control volume based on the evaluation of the traction vector.

12. The computer-implemented method of claim 10, wherein the at least one control point defines at least one traction on the boundary of the control volume.

13. The computer-implemented method of claim 12, wherein the at least one control point comprises a plurality of control points that define the traction field.

14. The computer-implemented method of claim 1, wherein the change to the at least one control point comprises a displacement field.

15. The computer-implemented method of claim 14, wherein determining the fluid pressure change of the control volume based on the change to the at least one control point comprises:
evaluating, with the one or more hardware processors, a displacement vector of the displacement field; and
determining, with the one or more hardware processors, the fluid pressure change of the control volume based on the evaluation of the displacement vector.

16. The computer-implemented method of claim 14, wherein the at least one control point defines at least one displacement on the boundary of the control volume.

17. The computer-implemented method of claim 16, wherein the at least one control point comprises a plurality of control points that define the displacement field.

18. The computer-implemented method of claim 1, wherein the control volume comprises at least a portion of a wellbore formed from a terranean surface to the subterranean formation, and the portion of the wellbore is fluidly sealed from the hydraulic fracture.

19. The computer-implemented method of claim 18, wherein the at least one control point comprises a plurality of control points representative of a plurality of displacements on a boundary of the portion of the wellbore.

20. The computer-implemented method of claim 18, wherein the wellbore comprises a first wellbore, and the hydraulic fracture formed in or adjacent the subterranean formation emanates from a second wellbore different than the first wellbore.

21. The computer-implemented method of claim 18, wherein the at least one reservoir characteristic comprises a reservoir effect that comprises at least one of undrained rock compression or fluid migration.

22. The computer-implemented method of claim 21, further comprising determining at least a part of a hydraulic fracture geometry of the hydraulic fracture or a fracture growth rate of the hydraulic fracture, or both based on the determination of the undrained rock compression effect.

23. The computer-implemented method of claim 21, further comprising determining an effective hydraulic connectivity in the subterranean formation or a rate of leak-off of a treatment fluid that forms the hydraulic formation into the subterranean formation based on the determination of the fluid pressurization effects.

24. The computer-implemented method of claim 1, wherein the hydraulic fracture emanates from a first wellbore formed in the subterranean formation, and the control volume comprises a sealed section of a second wellbore formed in the subterranean formation that is different than the first wellbore.

25. The computer-implemented method of claim 24, wherein the at least one control point comprises at least one displacement representative of at least one of a displacement, a stress tensor, a strain tensor, or a traction vector on a boundary of the sealed section.

26. The computer-implemented method of claim 24, wherein the at least one dimension of the hydraulic fracture comprises at least one of a half-length of the hydraulic fracture, a length of the hydraulic fracture, a half-height of the hydraulic fracture, or a height of the hydraulic fracture.

27. The computer-implemented method of claim 1, wherein the analytical solution comprises $u_i(x)=f(\text{Dim}_{treatfrac},\text{vec})$,
where $u_i(x)$ is the displacement field that comprises the at least one control point, and is a function of one or more dimensions of the control volume ($\text{Dim}_{cv}$), one or more dimensions of the treatment fracture ($\text{Dim}_{treatfrac}$), and a vector between the control volume and the treatment fracture (vec).

28. The computer-implemented method of claim 27, wherein the analytical solution further comprises $u_i(x)=f(\text{Dim}_{treatfrac},\text{vec},\text{rot},\text{geo})$,
where $u_i(x)$ is the displacement field that comprises the at least one control point, and is a function of one or more dimensions of the control volume ($\text{Dim}_{cv}$), one or more dimensions of the treatment fracture ($\text{Dim}_{treatfrac}$), a vector between the control volume and the treatment fracture (vec), a rotation of the control volume relative to the treatment fracture (rot), and one or more geologic properties of the subterranean formation (geo).

29. The computer-implemented method of claim 1, wherein the analytical solution comprises a modified Eshelby solution.

30. The computer-implemented method of claim 29, wherein the modified Eshelby solution comprises one or more equations that determines the at least one control point based at least in part on a plurality of parameters that are associated with the control volume and the hydraulic fracture.

31. The computer-implemented method of claim 30, wherein the plurality of parameters comprise at least two dimensions of the control volume, at least two dimensions of the hydraulic fracture, and at least three dimensions that represent a vector between the control volume and the hydraulic fracture.

32. The computer-implemented method of claim 31, wherein the plurality of parameters further comprise at least three dimensions that represent an axis of rotation between the control volume and the hydraulic fracture and an angle of rotation about the axis of rotation.

33. The computer-implemented method of claim 30, wherein the plurality of parameters further comprise one or more geologic characteristics of the subterranean formation.

34. The computer-implemented method of claim 30, wherein at least one of the equations comprises:

$$u_i(x) = \frac{1}{8\pi(1-v)}(\psi_{,jli}\epsilon^*_{jl} - 2v\epsilon^*_{mm}\phi_{,i} - 4(1-v)\epsilon^*_{il}\phi_{,l}),$$

where $u_i(x)$ represents the displacement field that comprises the at least one control point, $\epsilon^*$ is the Eigenstrain, $v$ is Poisson's ratio, and $\psi$ and $\Phi$ are given by $$\Phi(x) = \int_\Omega |x - x'| dx', \text{ and } \Psi(x) = \int_\Omega \frac{1}{|x - x'|} dx'.$$

35. The computer-implemented method of claim 1, wherein determining, with a numerical solution executed by the one or more hardware processors, a fluid pressure change of the control volume based on the change to the at least one control point, comprises:
    calculating, with the numerical solution executed by the one or more hardware processors, a pressure transfer function on the control volume based on the fluid pressure change on the control volume.

36. A distributed computing system, comprising:
    one or more memory modules; and
    one or more hardware processors communicably coupled to the one or more memory modules and configured to execute instructions stored in the one or more memory modules to perform operations comprising:
        determining, with an analytical solution, a change to at least one control point of a boundary of a control volume defined in a subterranean formation, the change to the at least one control point caused by a hydraulic fracture formed in or adjacent the subterranean formation;
        determining, with a numerical solution, a fluid pressure change of the control volume based on the change to the at least one control point; and
        determining, with a mechanical model based on the analytical solution and the numerical solution, at least one reservoir characteristic based at least in part on the determined fluid pressure change of the control volume.

37. An apparatus that comprises a non-transitory, tangible computer readable media that stores instructions that, when executed by one or more computing systems that comprise one or more hardware processors, cause the one or more computing systems to perform operations comprising:
    determining, with an analytical solution, a change to at least one control point of a boundary of a control volume defined in a subterranean formation, the change to the at least one control point caused by a hydraulic fracture formed in or adjacent the subterranean formation;
    determining, with a numerical solution, a fluid pressure change of the control volume based on the change to the at least one control point; and
    determining, with a mechanical model based on the analytical solution and the numerical solution, at least one reservoir characteristic based at least in part on the determined fluid pressure change of the control volume.

38. A computer-implemented method, comprising:
    determining, with an analytical solution executed by one or more hardware processors, a change to at least one control point of a boundary of a control volume defined in a subterranean formation, the change to the at least one control point caused by a hydraulic fracture formed in or adjacent the subterranean formation;
    determining, with a numerical solution executed by the one or more hardware processors, a fluid pressure change of the control volume based on the change to the at least one control point, wherein the determining with the numerical solution comprises calculating, with the numerical solution executed by the one or more hardware processors, a pressure transfer function on the control volume based on the fluid pressure change on the control volume; and
    determining, with a mechanical model generated by the one or more hardware processors based on the analytical solution and the numerical solution, at least one reservoir characteristic based at least in part on the determined fluid pressure change of the control volume.

39. A computer-implemented method, comprising:
    determining, with an analytical solution executed by one or more hardware processors, a change to at least one control point of a boundary of a control volume defined in a subterranean formation, the change to the at least one control point caused by a hydraulic fracture formed in or adjacent the subterranean formation, wherein the hydraulic fracture emanates from a first wellbore formed in the subterranean formation, and the control volume comprises a sealed section of a second wellbore formed in the subterranean formation that is different than the first wellbore;
    determining, with a numerical solution executed by the one or more hardware processors, a fluid pressure change of the control volume based on the change to the at least one control point; and
    determining, with a mechanical model generated by the one or more hardware processors based on the analytical solution and the numerical solution, at least one reservoir characteristic based at least in part on the determined fluid pressure change of the control volume, the at least one reservoir characteristic comprising at least one dimension of the hydraulic fracture that comprises at least one of a half-length of the hydraulic fracture, a length of the hydraulic fracture, a half-height of the hydraulic fracture, or a height of the hydraulic fracture.

\* \* \* \* \*

UNITED STATES PATENT AND TRADEMARK OFFICE
CERTIFICATE OF CORRECTION

PATENT NO. : 11,767,751 B2  
APPLICATION NO. : 17/518402  
DATED : September 26, 2023  
INVENTOR(S) : Erica Wilhelmina Catharina Coenen Page 1 of 1

It is certified that error appears in the above-identified patent and that said Letters Patent is hereby corrected as shown below:

In the Claims

Claim 10, Column 24, Line 65, delete "claim 1;" and insert -- claim 1, --

Claim 27, Column 26, Line 20, delete "($Dim_{ev}$)," and insert -- ($Dim_{cv}$), --

Claim 28, Column 26, Line 29, delete "($Dim_{ev}$)," and insert -- ($Dim_{cv}$), --

Signed and Sealed this  
Twenty-first Day of November, 2023

Katherine Kelly Vidal  
*Director of the United States Patent and Trademark Office*